(12) United States Patent
Chang

(10) Patent No.: US 11,321,507 B1
(45) Date of Patent: May 3, 2022

(54) SYSTEM AND METHOD FOR ACCURATE X HANDLING USING LOGIC AND SYMBOLIC COSIMULATION

(71) Applicant: Avery Design Systems, Inc., Tewksbury, MA (US)

(72) Inventor: Kai-Hui Chang, Andover, MA (US)

(73) Assignee: Avery Design Systems, Inc., Tewksbury, MA (US)

(*) Notice: Subject to any disclaimer, the term of this patent is extended or adjusted under 35 U.S.C. 154(b) by 285 days.

(21) Appl. No.: 16/847,094

(22) Filed: Apr. 13, 2020

Related U.S. Application Data

(60) Provisional application No. 62/833,100, filed on Apr. 12, 2019.

(51) Int. Cl.
*G06F 17/10* (2006.01)
*G06F 30/20* (2020.01)
*G06F 119/02* (2020.01)

(52) U.S. Cl.
CPC .......... *G06F 30/20* (2020.01); *G06F 2119/02* (2020.01)

(58) Field of Classification Search
CPC .............................. G06F 30/20; G06F 2119/02
USPC ...................................................... 703/13, 15
See application file for complete search history.

(56) References Cited

U.S. PATENT DOCUMENTS

| 8,402,405 B1 | 3/2013 | Chang | |
| 2003/0066039 A1* | 4/2003 | Zhong | G01R 31/318364 716/106 |
| 2007/0061765 A1* | 3/2007 | Jacobi | G06F 30/3323 716/106 |

OTHER PUBLICATIONS

"Handling Nondeterminism in Logic Simulation So That Your Waveform Can Be Trusted Again", IEEE Design and Test, Dec. 2016.
"Accurately Handle Don't-Care Conditions in High-Level Designs and Application for Reducing Initialized Registers", IEEE Trans. on Computer-Aided Design, Apr. 2010.
"Parallel Logic Simulation—a Myth or Reality?", IEEE Computer, Apr. 2012.

* cited by examiner

*Primary Examiner* — Andre Pierre Louis
(74) *Attorney, Agent, or Firm* — Loginov & Associates, PLLC; William A. Loginov

(57) ABSTRACT

A computer executable system that runs symbolic simulation with formal X-analysis along with logic simulation to determine if Xs produced in logic simulation are real or not. Simulated values in logic simulation shown to be incorrect are rectified using formal analysis results to produce X-accurate simulation results that match real hardware.

19 Claims, 4 Drawing Sheets

| always @(posedge clk) | assign o = s & a \| !s & b |
| --- | --- |
| if (cond) | |
|   b <= 0; | When s is X, a is 1 and b |
| else | is 1, o should be 1. However, |
|   b <= 1; | logic simulation produces X. |
| (a) | (b) |

SYSTEM AND METHOD FOR ACCURATE X HANDLING USING LOGIC AND SYMBOLIC COSIMULATION

RELATED APPLICATIONS

This application claims the benefit of U.S. Provisional Application Ser. No. 62/833,100, filed Apr. 12, 2019, entitled SYSTEM AND METHOD FOR ACCURATE X HANDLING USING LOGIC AND SYMBOLIC COSIMULATION, the entire disclosure of which is herein incorporated by reference.

FIELD OF THE INVENTION

The present application relates generally to integrated circuit design and, most particularly, to techniques for correcting logic simulation results when unknowns (Xs) exist.

BACKGROUND OF THE INVENTION

Physical synthesis optimizations and low-power requirements have left more registers uninitialized after reset compared with old design practices that reset most design registers. Additionally, power-down blocks during normal operation can create unknown values in design registers. In logic simulation, "Xs" are assigned to represent those unknown values which can be either 0 or 1 in real hardware. Such unknown values can result in non-deterministic states in a circuit, making the operation of the circuit unpredictable. Therefore, it is important to make sure those Xs do not propagate to important registers and corrupt circuit functionality.

Logic simulation is the most commonly-used verification method and is the main technique to catch X-related issues. However, logic simulation cannot handle Xs correctly due to X-optimism and X-pessimism problems. X-optimism produces a non-X value in logic simulation where an X should be produced. In other words, X is masked. X-pessimism produces an X where a non-X value should be produced. In other words, a non-real false X is created. Two examples are shown in FIG. 1. Typically, X-optimism problems are most serious in Register Transfer Level (RTL) simulation because they mask X bugs. For gate-level simulation, X-pessimism is the major issue because it can create numerous false Xs that corrupt simulation results and render logic simulation useless.

To address X-optimism in simulation, one solution is to always corrupt variables on the left-hand-side of assignments under if/case branches if the condition is X. Take FIG. 1(a) as an example, variable "b" will be updated to X instead of 1 if "cond" is X at positive edge of "clk". The main disadvantage of this method is that it can be overly X-pessimistic and create Xs that are false. For example, if the Right-Hand-Side (RHS) of both assignments in FIG. 1(a) are both 0, then "b" should still be 0 even when "cond" is X. However, "cond" will be updated to X instead, creating an X that is false. Most commercial logic simulators provide this feature as the most pessimistic handling of Xs. For example, Synopsys, Mentor Graphics and Cadence all have options in their simulators to enable such special X handling modes.

To address the shortcomings of the above method, a better solution is to consider the RHS values of assignments and only corrupt the variables on the Left-Hand-Side (LHS) of assignments to Xs if their RHS values differ. Take FIG. 1(a) for example, "b" will be corrupted to X because possible values when "cond" is X differ. But if the RHS values of assignments are both 0, "b" will be updated to 0 instead of X. Most commercial logic simulators also provide this feature for more accurate X handling.

The above two methods solve X-optimism problems. However, they can convert X-optimism problems into X-pessimism problems and inadvertently create false Xs. Take FIG. 1(a) for example, the above methods convert "b" from 1 to X when "cond" is X. However, if the X propagate to signal "s" in FIG. 1(b), signal "o" will be corrupted to X even though 1 should be produced. Such false Xs can further corrupt other signals and make simulation results useless. What is worse is that if a designer tries to resolve X issues based on those incorrect false Xs, the designer can create lower quality designs because the problems being solved do not really exist, and any change to the design (typically adding additional resets to flipflops) adds unneeded overhead to the circuit.

To resolve X-pessimism issues in gate-level simulation, our prior art "System and Method for Correcting Gate-level Simulation When Unknowns Exist", U.S. Pat. No. 8,402,405, can be used. However, it cannot handle RTL designs and cannot address X-optimism issues.

Another issue that the above methods cannot resolve is sequential false Xs. Sequential false Xs are Xs that take more than one cycle to resolve. Take FIG. 2 for example, output at g6 should be 0 because both its input Xs originated from reg1, but one X is inverted by a NOT gate (g3) one cycle earlier. The first two methods described above can consider values at the RHS of assignments at the same cycle and do not corrupt the LHS if the RHS values are the same, but they cannot consider RHS values at previous cycles that affect the current assignment. As a result, sequential false Xs cannot be resolved by those methods. Our prior art (U.S. Pat. No. 8,402,405) also considers only combinational logic and cannot handle sequential false Xs, either.

To handle sequential false Xs and provide more accurate simulation results when Xs exist, our prior art "Handling Nondeterminism in Logic Simulation So That Your Waveform Can Be Trusted Again", IEEE Design and Test, December 2016, proposed to use symbolic simulation to solve the problem. Symbolic simulation is different from logic simulation in that logic simulation simulates one specific value while symbolic simulation simulates symbols that represent all possible values. Take a two-input AND gate as an example, logic simulation takes values like {0, 1} as inputs and produces 0 at its output. Symbolic simulation takes two symbols, s0 and s1, as inputs and generates a symbolic trace "s0 AND s1" at its output. This symbolic trace can be converted to Boolean functions and is suitable for formal analysis. Given that an X value means both 0 and 1 values are possible and a symbol can represent both values, by replacing Xs with symbols and perform symbolic instead of logic simulation, accurate X propagation analysis can be performed.

After symbolic simulation produces a symbolic trace for a variable, our prior art "Accurately Handle Don't-Care Conditions in High-Level Designs and Application for Reducing Initialized Registers", IEEE Trans. on Computer-Aided Design, April 2010, provides the steps to determine if the trace can produce both 0 and 1 values (a real X) or not. The steps are summarized below and the built structure for X analysis is illustrated in FIG. 3.

(1) Duplicate the symbolic trace once to form a new symbolic trace. Symbols that were injected due to Xs remain separate primary inputs for each copy. All other symbols are driven by the same primary inputs for both copies of symbolic traces.

(2) Create a miter from the outputs of the two symbolic traces. The miter output is 1 if any of the corresponding output values can differ. A miter is typically implemented by XORing corresponding outputs, and then the results are ORed to produce a single output.

(3) A formal tool, like a SAT solver, can then be used to prove if the miter output is constant 0 or can be 1. If the output is 0, the signal has a non-X value, and the non-X value can be obtained by simulating any value using the symbolic trace. If the output is 1, the signal can be either 0 or 1 and should have an X value.

Symbolic simulation and formal analysis can accurately handle Xs, including sequential false Xs, and produce correct simulation values for logic simulation. However, like all formal methods, scalability is an issue. To address this issue, our prior work published in IEEE Design and Test proposes the following steps to analyze Xs in a design:

(1) Partition the design into smaller blocks.
(2) Run logic simulation to dump waveforms for the blocks.
(3) For each block, partition the trace into several time intervals.
(4) For each interval, replace Xs with symbols and perform symbolic simulation using the simulation values at primary inputs from the waveform as stimulus.
(5) At the end of the interval, for each register build a miter from its symbolic trace and check if the output of the miter can be 1. If so, the value of the register is affected by Xs. If not, the register has a non-X value.

The prior art addresses the scalability issue and can handle large designs effectively. However, it is a multi-step flow that requires a user to dump a waveform first, then set up a separate formal symbolic simulation tool to perform X analysis using the waveform as stimulus. Another limitation in our prior art is that even though symbolic simulation can find X-optimism and X-pessimism issues in logic simulation, there is no good way to automatically use the results to correct logic simulation results because the two tools are different and are used separately. As a result, the user needs to manually add deposits or forces in order to change logic simulation values based on symbolic simulation results.

SUMMARY OF THE INVENTION

The present application corrects inaccurate logic simulation values when Xs exist by invoking symbolic simulator to perform formal analysis concurrently with logic simulation. This can be achieved by the following steps:

(1) Invoke a symbolic simulator for a block of the design that needs to be analyzed. The symbolic simulator reads the design code for the block and prepares for symbolic simulation.

(2) When analysis starts, the logic simulator sends current state to the symbolic simulator and the symbolic simulator updates its state based on the logic simulation state.

(3) The logic simulator and the symbolic simulator exchange synchronizations to advance simulation time simultaneously. At each timestamp if there are input port value changes to the block, the logic simulator sends port values to the symbolic simulator for the symbolic simulator to simulate concurrently.

(4) At X-value checkpoints, logic simulation determines variables that need to be checked and the logic simulator sends the list to the symbolic simulator. The symbolic simulator uses formal analysis to analyze if those variables are Xs or not then send the results back to the logic simulator. When the logic simulator receives the results, it compares current logic simulation values with the received results. If the results are different, a message is shown to warn the user, and variable values in logic simulation are updated using the received results.

The present application provides a system that connects logic simulation and symbolic simulation to address problems in the solutions described earlier. In this system logic and symbolic simulators need to perform analysis in time-synchronized locked steps so that stimulus can be sent from logic simulator to symbolic simulator, and the analyzed results can be sent from symbolic simulator to logic simulator to correct simulated values. This is achieved using our SimCluster tool, and its basic algorithm is described in our prior art "Parallel Logic Simulation—A Myth or Reality?", IEEE Computer, April 2012.

The SimCluster tool is a coarse-grained parallel simulator that partitions a design into several major blocks, and each block is simulated by its own logic simulator. The SimCluster tool controller then handles communication and synchronization among partitions to achieve parallel simulation. It is an add-on to logic simulators and works as follows.

(1) Get port changes from each partition, then send port changes to other partitions, repeat until no more port changes
(2) Get next-event time from each partition
(3) Determine the minimum next event time from all partitions and ask all partitions to advance their simulation time to the minimum one
(4) Repeat until simulation finishes The SimCluster tool technology is used for parallel logic simulation and has never been used for logic/symbolic cosimulation. The present application extends SimCluster tool technology to symbolic simulation. Additionally, the present application proposes a system that controls the communication between logic and symbolic simulation for accurate X analysis.

BRIEF DESCRIPTION OF THE DRAWINGS

For a more complete understanding of the present application, reference should be made to the following detailed description and accompanying drawing figures, in which like reference numerals identify like elements in the figures, and in which.

DETAILED DESCRIPTION

Figures 1, 2:
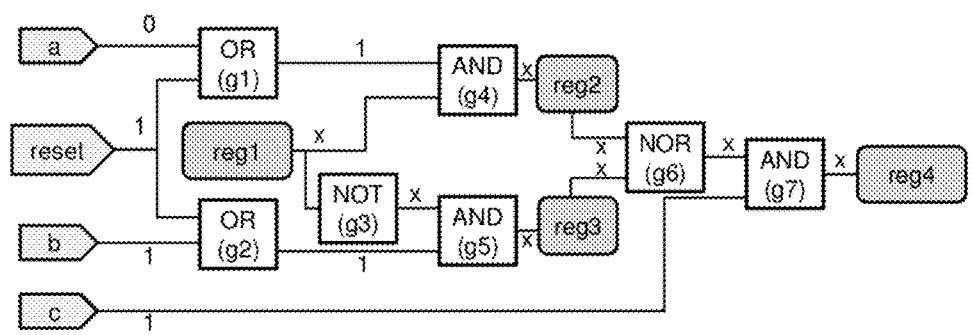
FIG. 1 depicts (a) X-optimism example. If "cond" is X, else branch is executed and "b" becomes 1. But in hardware "b" can be either 0 or 1 depending on the real value of "cond". (b) X-pessimism example. Hardware value of "o" is 1 but logic simulation produces X.
FIG. 2 depicts a sequential false X example. Output at g6 should be 0 instead of X because both Xs at its input originated from reg1 one cycle before with one X inverted by the NOT gate (g3).
Figure 3:
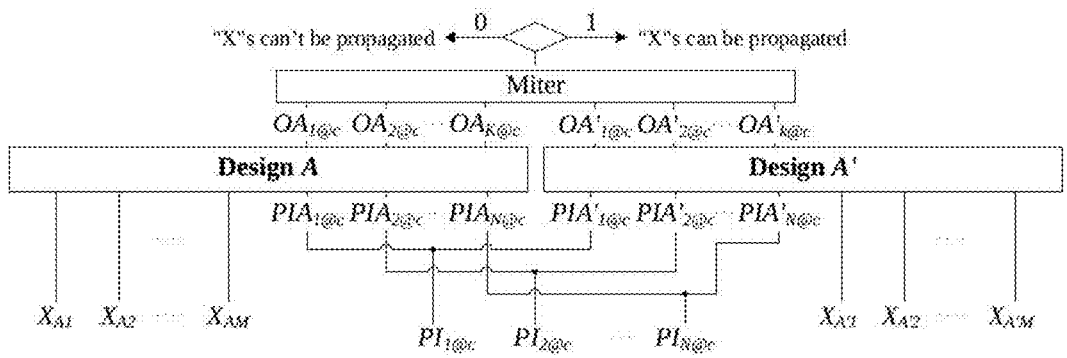
FIG. 3 depicts an illustration of symbolic X-propagation checking. $PI_{i@c}$, $PIA_{i@c}$ and $PIA'_{i@c}$ denote primary inputs, $X_{Ai}$ and $X_{A'i}$ denote symbols representing Xs, and $OA_{i@c}$ and $OA'_{i@c}$ denote outputs of symbolic traces.

The system and method described in the present application use logic and symbolic cosimulation to correct logic simulation inaccuracy when Xs exist. The steps to perform X analysis using cosimulation for a given block inside a design are as follows:

(1) The logic simulator invokes a symbolic simulator at block 405. The symbolic simulator reads design code for the block at block 410 and prepares symbolic simulation.

(2) The logic simulator sends current simulation state to the symbolic simulator as the initial state for symbolic simulation at block 415. The symbolic simulator sets its initial state for symbolic simulation accordingly at block 420.

(3) The logic simulator and the symbolic simulator perform lock-stepped cosimulation. This is achieved by sending port value changes and next synchronization (event) time from the logic simulator to the symbolic simulator at block 425. The symbolic simulator performs symbolic simulation using port values from the logic simulator, sends its next event time to the logic simulator, and advances its time based on the next event time sent back from the logic simulator at block 430.

(4) Step 3 is repeated until the whole simulation finishes. At this time the logic simulator kills the symbolic simulator and then ends itself.

Figure 4:
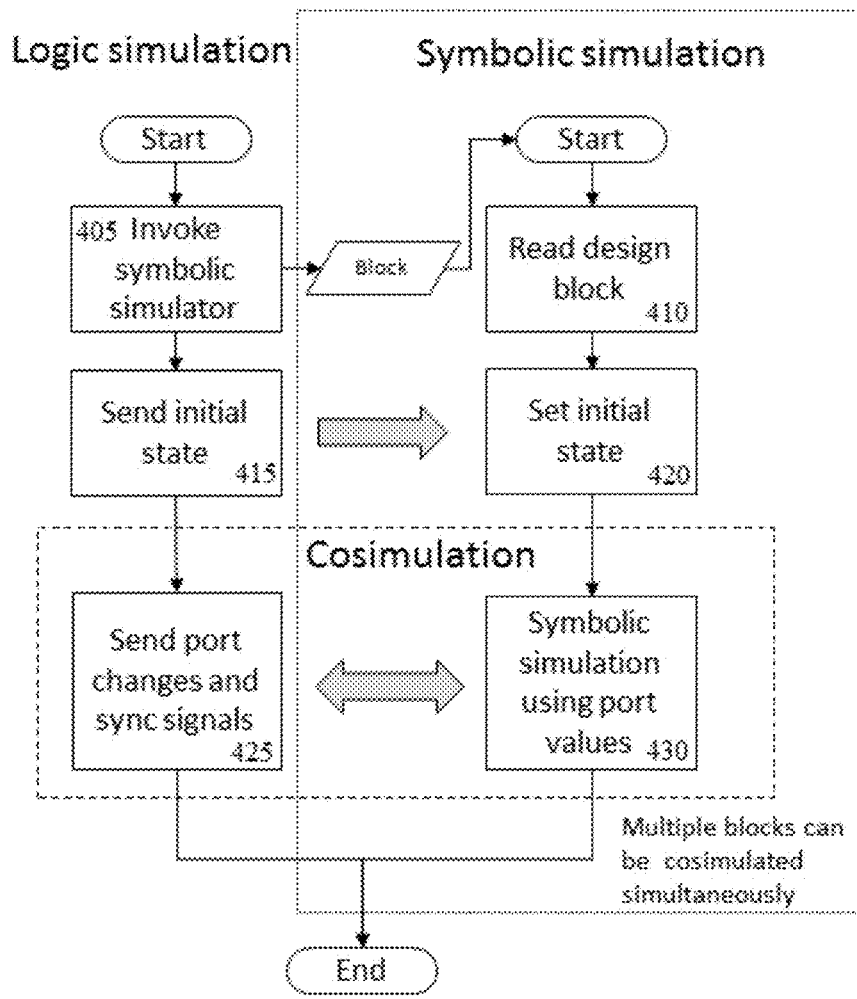
FIG. 4 depicts a flow chart to show how a logic simulator invokes one or more symbolic simulators and cosimulate with the one or more symbolic simulators.

The flow is summarized in the flow chart 400 of FIG. 4. Note that if there are multiple blocks inside a design that need to be analyzed, multiple symbolic simulators can be invoked to perform cosimulation for the blocks.

In the present application a checkpoint is created at a simulation timestamp if logic simulation values should be checked using symbolic simulation results at that time. Typically a checkpoint should be introduced at each active clock edge when new values are to be latched to registers to make sure incorrect logic simulation values are corrected before they propagate to storage elements that can further corrupt downstream simulation values. One or more operations are performed at a checkpoint as described below.

(1) Logic simulation determines variables in the block that need to be checked at 505. Typically the target variables are registers that store state values. If only X-optimism issues need to be found, only variables that are not Xs in logic simulation need to be checked. If only X-pessimism issues need to be found, only variables that are Xs in logic simulation need to be checked. If both X-optimism and X-pessimism issues need to be found, all variables need to be checked. The list of variables that need be checked is then sent from the logic simulator to the symbolic simulator.

(2) After the symbolic simulator receives the list of variables to check at block 510, it uses formal analysis at block 515 to determine whether a variable is X by analyzing the symbolic trace of the variable. There are various methods to perform this analysis and any of them can be used, such as the one described in our prior art. Once the value of the variable is determined, the result is sent back to the logic simulator at block 520.

(3) When the logic simulator receives the value of a variable from the symbolic simulator, it compares the received value with its currently simulated value for the variable at block 525. If the values differ, a message is printed to notify the user, and logic simulation value of the variable is updated using the received value at block 530. In this way inaccurate logic simulation results can be corrected.

Figure 5:
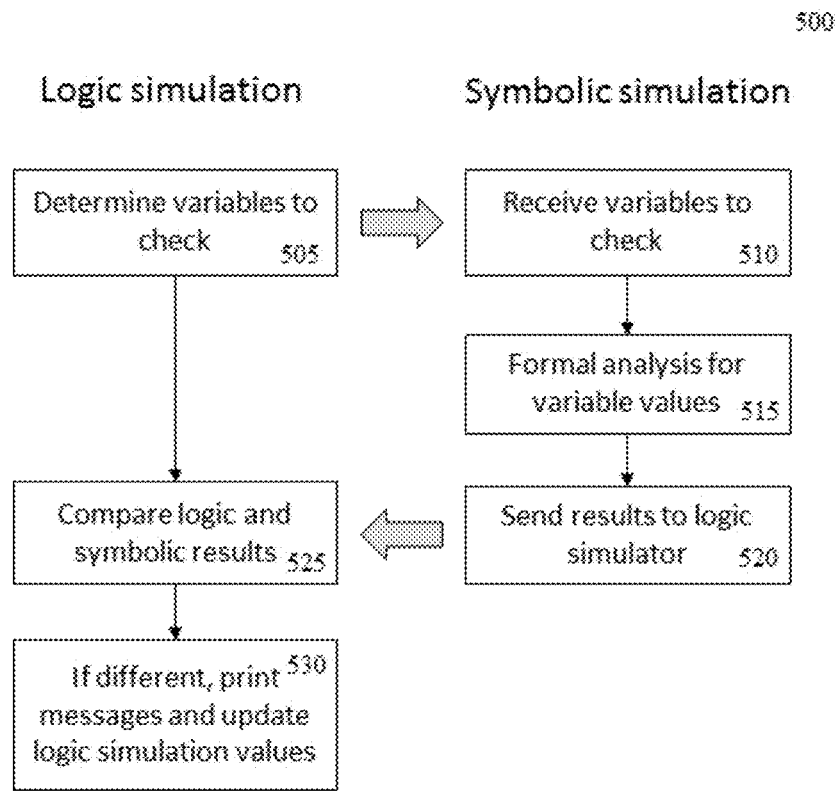
FIG. 5 depicts a flow chart to show the steps to check variable values in logic simulation at a checkpoint.
Figure 6:
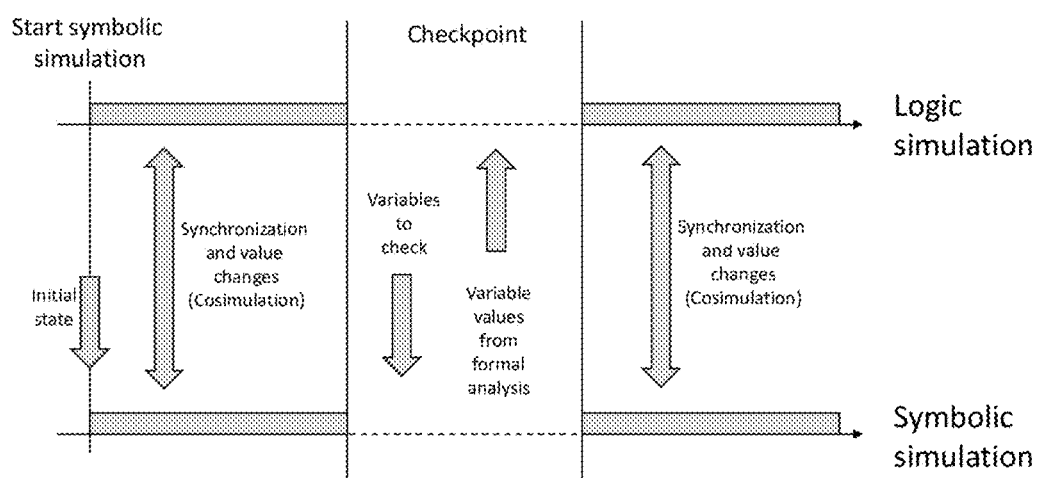
FIG. 6 depicts a simulation timeline that shows how logic simulation interacts with symbolic simulation to perform cosimulation and check variable values at checkpoints.

FIG. 5 summarizes the flow 500 and FIG. 6 provides an illustration on the interactions between logic and symbolic simulation during cosimulation of a test.

One advantage of the present application compared with prior art is that the present application is much more accurate than the methods used by logic simulators because symbolic simulation is used, which provides correct sequential analysis that can find sequential false Xs. Additionally, it does not have false alarms and does not miss bugs because formal analysis provides results that will match real hardware. Compared with the pure formal solution that runs separate symbolic simulations, the system and method described in the present application is much easier to setup and use because communications between the logic simulator and the symbolic simulator are handled automatically and all the formal analysis is performed under the hood by the invoked symbolic simulators. From a user's perspective, the user is still running logic simulation, but the results suddenly become hardware-accurate without X-optimism or X-pessimism issues due to the use of formal analysis performed on the symbolic simulator.

In the present application a symbolic simulator is invoked by the logic simulator when a block needs to be analyzed. Typically analysis starts around reset time and symbolic simulation is invoked at that time. Not invoking symbolic simulator too early, such as before reset when everything is X, makes sure the symbolic simulator does not spend time doing unneeded symbolic simulation. After symbolic simulation starts, if Xs exist in a block for a long time, symbolic simulation of the block can become exceedingly slow due to the complexity to track all the X propagations. This can happen if there is an extended period of time between block reset and the use of the block. In this case, symbolic simulation for the period of time that the block is idle is actually not needed, and performing symbolic simulation for that period of time is a waste of effort. To address this issue, we allow the user to pause and resume symbolic simulation. This is achieved using the following method.

To pause symbolic simulation, the logic simulator sends port value changes and synchronization signals to the symbolic simulator for the current timestamp, then waits for the symbolic simulator to finish all activities at the current timestamp. Then the logic simulator stops sending additional port value changes or synchronization signals to the symbolic simulator. At this time the symbolic simulator stays idle waiting for the next synchronization (event) time to advance to.

To resume symbolic simulation, the logic simulator sends current timestamp so that symbolic simulation can advance to the same time. The logic simulator then sends current block state to the symbolic simulator, which are values of all storage elements in the block. The symbolic simulator updates the storage elements in the block accordingly so that its current state matches the state in logic simulation. The logic simulator then starts sending port value changes and synchronizations to the symbolic simulator, and cosimulation starts again.

In some designs, Xs can remain in an active block for an extended period of time, making symbolic simulation slow. Because the block is active, X analysis needs to be performed, and symbolic simulation cannot be paused. Since most sequential false Xs are typically resolved in a small number of cycles, one can perform "abstraction" once every N cycles to reduce the complexity of symbolic simulation, where N can be decided empirically based on how much time symbolic simulation has spent and how complex the symbolic traces are. When abstraction is performed, the logic simulator sends its state to the symbolic simulator, and the symbolic simulator updates its state accordingly. At this time in symbolic simulation, all existing symbolic traces are replaced with new symbols from the new state: if a variable has a non-X value, that value is used; and if a variable has an X value, a new symbol to represent the X is used. In this way symbolic simulation starts fresh from the new state, and symbolic simulation complexity is reduced.

In practice abstraction is typically performed right after a checkpoint at given intervals. For examples, it can be performed once every 5 cycles. Abstraction can also be performed automatically. For example, if finishing one cycle takes more than a user-provided amount of time, abstraction is performed.

Figure 7:
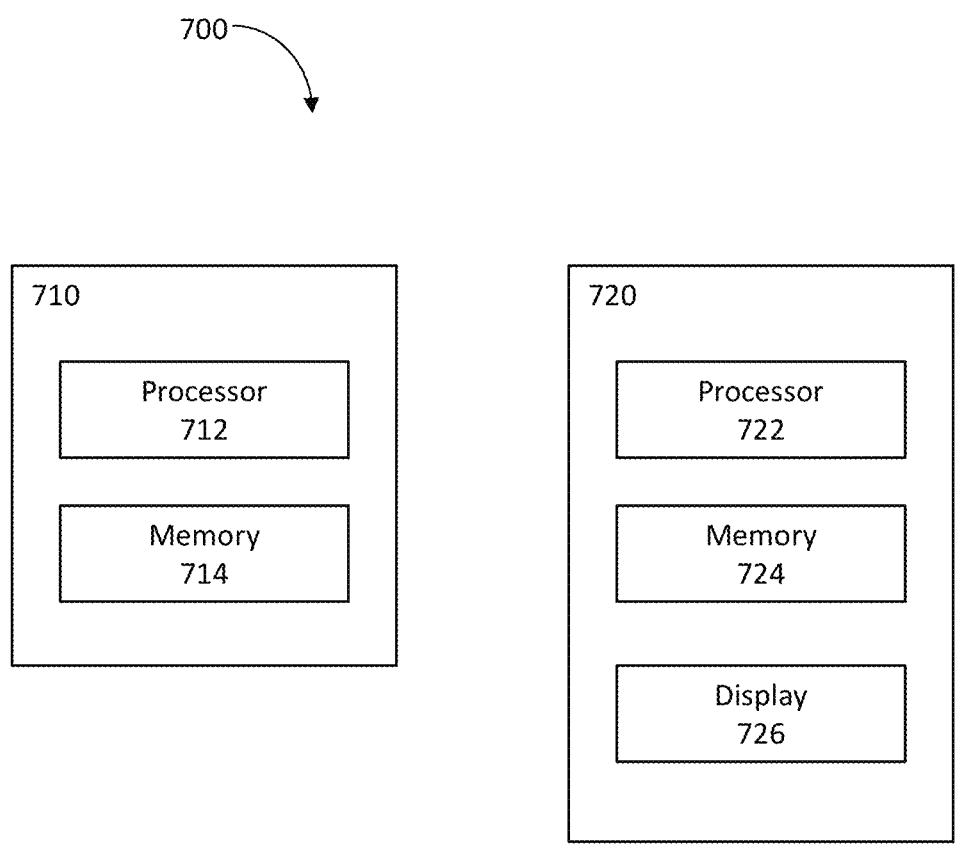
FIG. 7 is a block diagram of a system for implementing the processes and/or subprocesses described above according to aspects of the disclosure.

FIG. 7 is a block diagram of a system 700 for implementing the processes and/or subprocesses described above according to aspects of the disclosure, for example FIGS. 4-6. As shown, the system 700 may include a computing device 710 and a client computing device 720.

The computing device 710 may include at least one processor 712, at least one memory 714, and any other components typically present in general purpose computers. The memory 714 may store information accessible by the processor 712, such as instructions that may be executed by the processor or data that may be retrieved, manipulated, or stored by the processor. The memory 714 and/or processor 712 can be programmed to carry out a set of logical or arithmetic operations. In one example, the logical or arithmetic operations may be stored on a non-transitory computer readable medium. The processor obtains information from memories, performs logical or arithmetic operations based on programmed instructions, and stores the results of the operations into memories. Although FIG. 7 illustrates processor 712 and memory 714 as being within the same block, it is understood that the processor 712 and memory 714 may respectively comprise one or more processors and/or memories that may or may not be stored in the same physical housing. In one example, computer 710 may be a server that communicates with one or more client devices 720, directly or indirectly, via a network (not shown). The computing device 710 can interact with users through input and output devices (not shown), such as keyboards, mouses, disks, networks, displays and printers.

The client computing device 720 may be configured similarly to the computer 710, such that it may include processor 722, a memory 724, and any other components typically present in a general purpose computer. The client device 720 may be any type of computing device, such as a personal computer, tablet, mobile phone, laptop, PDA, etc. In this example, the client device 720 may also include a display 726, such as an LCD, plasma, touch screen, or the like.

The computer executable processing component described in the present disclosure can be executed by the processor(s) of one or more computing devices, such as computing device 710 and/or client computing device 720, or any other computing device.

The foregoing has been a detailed description of illustrative embodiments of the invention. Various modifications and additions can be made without departing from the spirit and scope of this invention. Features of each of the various embodiments described above can be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, while one sequential X-pessimism example is shown for illustrative purpose, any design netlist can be employed in accordance with the teachings herein. Accordingly, this description is meant to be taken only by way of example, and not to otherwise limit the scope of this invention.

What is claimed is:

1. A method of correcting inaccurate logic simulation values, comprising:
   invoking a symbolic simulator for at least one block of a design;
   sending a current state to the symbolic simulator from the logic simulator;
   updating an initial state of the symbolic simulator based on the current state;
   exchanging synchronizations between a logic simulator and the symbolic simulator to advance simulation time simultaneously;
   at X-value checkpoints, determining variables to be checked;
   sending a list of variables to be checked to the symbolic simulator;
   analyzing the variables to be checked to determine if the variables are Xs or not;
   sending the determination results to the logic simulator; and
   comparing current logic simulations to the determination results.

2. The method of claim 1, wherein the symbolic simulator reads design code for the at least one block and prepares for symbolic simulation.

3. The method of claim 1, wherein at each timestamp if there are input port value changes to the at least one block, the logic simulator sends port values to the symbolic simulator for the symbolic simulator to simulate concurrently.

4. The method of claim 1, wherein analyzing if the variables are Xs or not is performed using formal analysis.

5. The method of claim 1, wherein if the current logic simulations are different from the determination results, at least one of: displaying a warning message; or updating variable values.

6. The method of claim 1, further comprising pausing the simulation.

7. The method of claim 6, wherein pausing the simulation comprises:
   sending port value changes and synchronization signals to the symbolic simulator for a current timestamp;
   waiting for the symbolic simulator to finish all activities at the current timestamp; and
   stop sending port value changes and synchronization signals to the symbolic simulator after the current timestamp.

8. The method of claim 6, further comprising resuming the simulation.

9. The method of claim 8, wherein resuming the simulation comprises;
   sending synchronization signal to the symbolic simulator for a current time stamp;
   sending state values to the symbolic simulator for the current timestamp; and sending value port changes and synchronization signals to the symbolic simulator after the current time stamp.

10. A system for correcting inaccurate logic simulation values, comprising:
   a memory having program instructions stored thereon; and
   a processor configured to:
      invoke a symbolic simulator for at least one block of a design;
      send a current state to the symbolic simulator from the logic simulator;
      update an initial state of the symbolic simulator based on the current state;
      exchange synchronizations between a logic simulator and the symbolic simulator to advance simulation time simultaneously;
      at X-value checkpoints, determine variables to be checked;
      send a list of variables to be checked to the symbolic simulator;
      analyze the variables to be checked to determine if the variables are Xs or not;
      send the determination results to the logic simulator; and
      compare current logic simulations to the determination results.

11. The system of claim 10, wherein the symbolic simulator reads design code for the at least one block and prepares for symbolic simulation.

12. The system of claim 10, wherein at each timestamp if there are input port value changes to the at least one block, the logic simulator sends port values to the symbolic simulator for the symbolic simulator to simulate concurrently.

13. The system of claim 10, wherein analyzing if the variables are Xs or not is performed using formal analysis.

14. The system of claim 10, wherein if the current logic simulations are different from the determination results, at least one of: displaying a warning message; or updating variable values.

15. The system of claim 10, wherein the processor is further configured to pause the simulation.

16. The system of claim 15, wherein pausing the simulation comprises:
   sending synchronization signal to the symbolic simulator for a current time stamp;
   sending state values to the symbolic simulator for the current timestamp; and
   sending value port changes and synchronization signals to the symbolic simulator after the current time stamp.

17. The system of claim 15, wherein the processor is further configured resume the simulation.

18. The system of claim 17, wherein resuming the simulation comprises;
   sending synchronization signal to the symbolic simulator for a current time stamp;
   sending state values to the symbolic simulator for the current timestamp; and
   sending value port changes and synchronization signals to the symbolic simulator after the current time stamp.

19. At least one non-transitory computer readable medium storing instructions that, when executed by one or more processors, cause the one or more processors to:
   invoke a symbolic simulator for at least one block of a design;
   send a current state to the symbolic simulator from the logic simulator;
   update an initial state of the symbolic simulator based on the current state;
   exchange synchronizations between a logic simulator and the symbolic simulator to advance simulation time simultaneously;
   at X-value checkpoints, determine variables to be checked;
   send a list of variables to be checked to the symbolic simulator;
   analyze the variables to be checked to determine if the variables are Xs or not;
   send the determination results to the logic simulator; and
   compare current logic simulations to the determination results.

* * * * *